United States Patent Office 2,975,227
Patented Mar. 14, 1961

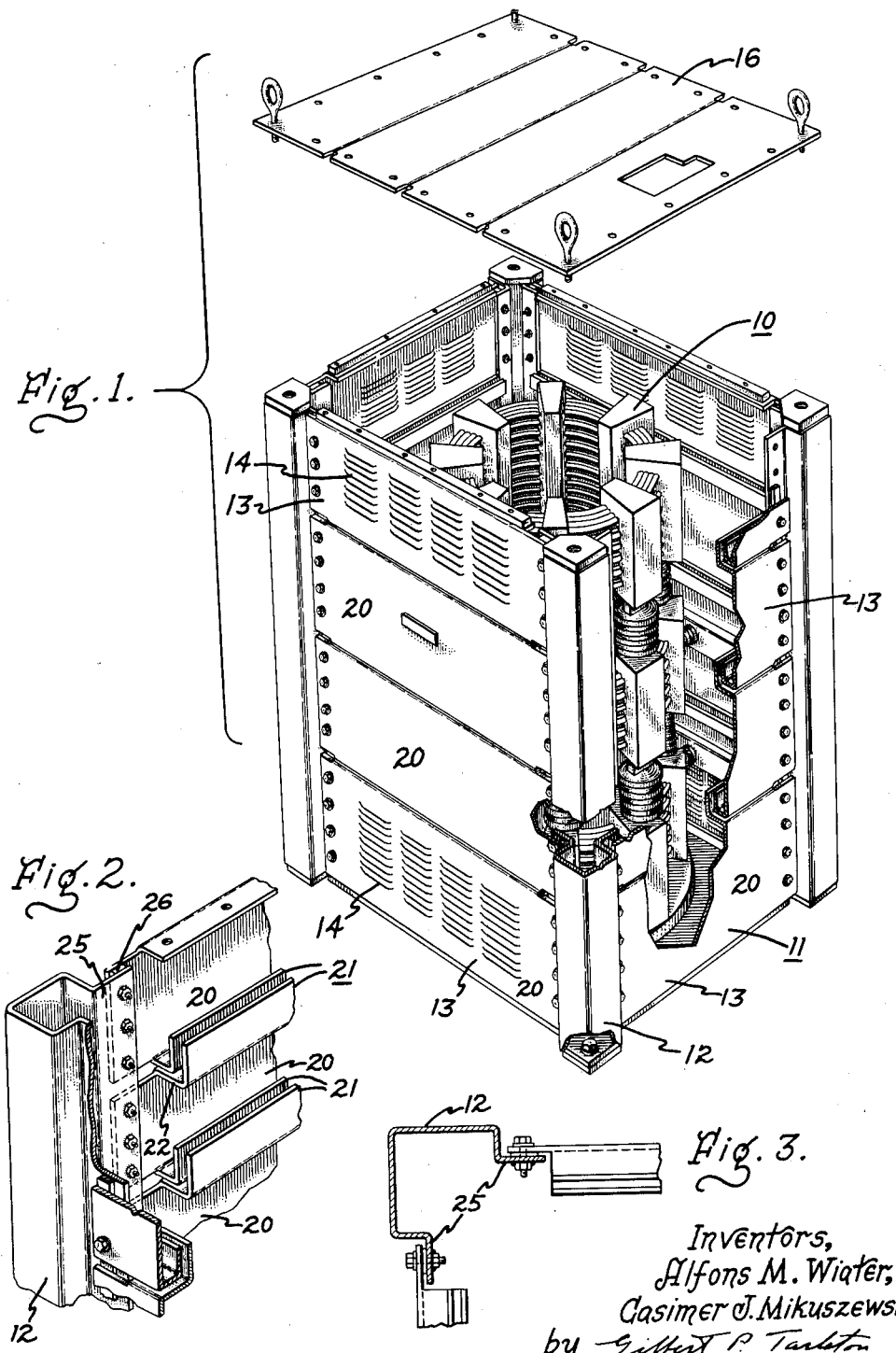

2,975,227

MEANS FOR ENCLOSING ELECTRICAL APPARATUS

Alfons M. Wiater and Casimer J. Mikuszewski, Adams, Mass., assignors to General Electric Company, a corporation of New York Filed Sept. 4, 1958, Ser. No. 759,002

3 Claims. (Cl. 174—52)

This invention relates to means for enclosing electrical apparatus, and more in particular to an improved enclosure for electrical induction apparatus. While the invention is hereinafter specifically disclosed with reference to concrete reactors, the invention is not intended to be limited to such use, and it will be obvious that the advantages obtained thereby will also be obtained when the enclosure is employed on other types of electrical apparatus such as transformers and the like.

In the past when providing enclosures for electrical reactors of one type (i.e., concrete reactors which comprise a plurality of conductor turns embedded in concrete supporting posts) it has been common to employ a metallic cubicle having four vertical metallic corner posts. A plurality of rectangular panels were provided extending between each pair of adjacent corner posts, the panels being bolted or otherwise rigidly affixed to the respective posts. The upper and lower edges of the panels were provided with right angle bends, and the bent portions of the edges of adjacent panels were bolted or otherwise rigidly affixed to each other in order to provide rigidity to the structure. In order to reduce losses in electrical apparatus due to currents being induced in the panels, it was necessary that insulation be provided between the adjacent panels and that the bolts joining the panels also be insulated to prevent passage of current therethrough.

While the above described enclosure was suitable from the standpoints of rigidity and losses, it has been found to have several disadvantages. Thus, while the practice of bolting the adjacent panels together increased the rigidity of the structure, the necessity for bolting the individual panels together made the fabrication of the cubicle more difficult, and also made the removal of any particular panel very difficult. The necessity for bolts and strip insulation between the panels necessarily increased the cost of the structure.

It is, therefore, an object of this invention to provide an improved enclosure for electrical apparatus.

A further object is to provide a readily fabricated metallic enclosure for electrical apparatus.

A still further object of this invention is to provide an enclosure for electrical apparatus having readily removable panels and in which rigidity of the structure does not rely upon interconnection between adjacent panels.

Another object of this invention is to provide a rigid panel structure for an enclosure for electrical apparatus, the panel facilitating fabrication of the enclosure.

Briefly stated, in accordance with one aspect of the invention, we provide a panel for an enclosure for electrical apparatus. The panel comprises a metallic sheet having a generally rectangular central portion, and a pair of opposite sides of the sheet have right angle bends. The bends define an edge portion on each of the sides that is parallel to the central portion and joined to the central portion by an intermediate portion. The intermediate portions are perpendicular to the central portion. The edge portions extend in the same direction from their respective intermediate portions so that one edge portion overlaps the central portion and the other edge portion extends beyond the central portion. The edge portion that overlaps the central portion is nearer to the central portion than the other edge portion, that is, the edge portion which overlaps the central portion extends in a plane that is nearer to the central portion than the plane of the other edge portion.

The panels are provided extending between vertical corner posts, and between each pair of adjacent corner posts a plurality of panels are provided in vertically spaced apart relationship. The edge portions of adjacent panels are arranged so that, while the adjacent panels do not touch each other, the upper edge portion of one panel horizontally overlaps the lower edge portion of the panel immediately above the first panel.

While the specification concludes with claims particularly pointing out and distinctly claiming the subject matter which we regard as our invention, it is believed that the invention will be better understood from the following description taken in connection with the accompanying drawing.

In the drawing:

Fig. 1 is a perspective partially exploded, partially cross-sectional view of an enclosure according to the present invention, the enclosure being illustrated as surrounding a concrete reactor, Fig. 2 is an enlarged perspective partially cross-sectional view of a portion of the enclosure of Fig. 1, and Fig. 3 is an enlarged partially cross-sectional view of a portion of the enclosure of Fig. 1.

Referring now to the drawing, and more particularly to Fig. 1, therein is illustrated an electrical apparatus 10 surrounded by a metallic enclosure 11. The electrical apparatus illustrated is a concrete reactor, that is, a reactor comprising a plurality of conductor turns embedded in concrete supporting posts. It will be obvious, of course, that the enclosure of the invention may be employed advantageously with other types of electrical apparatus without departing from the spirit and scope of the invention.

The enclosure 11 is comprised of a plurality of vertical metallic corner posts 12, of which four are employed in the present illustration, surrounding the electrical apparatus 10. A plurality of metallic panels 13 are provided extending between each adjacent pair of vertical corner posts, the panels 13 being vertically spaced apart and extending generally in vertical planes. If desired, the panels 13 may be provided with louvers 14 to facilitate the cooling of the apparatus. The panels 13, corner posts 12, and a suitable metallic cover 16 comprise a metallic cubicle that completely surrounds the apparatus 10.

The panels 13 comprise (Figs. 1 and 2) a generally rectangular vertical central portion 20 that forms the external surface of the enclosure. The upper and lower edges of the panels 13 are provided with right angle bends extending horizontally thereacross that define edge portions 21 extending in planes parallel to the planes of the central portions 20, and separated from the central portions 20 by horizontal portions 22 that lie in planes perpendicular to the plane of the central portion 20. The planes of the edge portions 21 are all on the same side of the central portions 20.

The vertical edge portions 21 on each panel are bent in the same directions from their respective intermediate horizontal portions 22 so that one edge portion 21 on each panel overlaps the central portion of the same panel, and the other edge portion extends beyond the central portion of each panel. Thus, as illustrated in Fig. 2, the lower edge portions 21 are bent upwardly so that they overlap the central portions 20, and the upper edge portions are bent upwardly from their respective intermediate portions 22 so that they extend upwardly beyond the upper edge of the central portions 20. On each panel, the vertical edge portion that overlaps the central portion 20 is located nearer to the central portion 20 than the other edge portion. As illustrated in Fig. 2, the lower edge portions of each panel are thus located in planes nearer to the plane of the central portions 20 than the plane of the upper vertical edge portions.

The corner posts 12 are provided with flanges 25 extending toward the next adjacent corner posts, and the panels 20 extending between the corner posts may be bolted to the flanges 25. For this purpose, the horizontal and vertical edge portions of the panels may be removed at the ends of the panels so that the panels may be bolted to the flanges 25 from the exterior of the enclosure. Strip insulation 26 may be provided between the panels and flanges 25 of the corner posts 12. The upper panel between each pair of corner posts is preferably provided with only a single bend in order to facilitate the bolting of the top cover 16 thereto.

The bent edge portions 21 and 22 of the panels 13 provide sufficient rigidity to the panels so that it is not necessary to bolt adjacent panels together. Therefore, in order to insulate adjacent panels from each other, and thereby reduce power loss due to the currents induced in the panels, the panels are merely vertically spaced apart to provide the necessary insulation. Since the vertical edge portions 21 on each edge of the panels are bent in the same direction, one vertical portion on one panel will overlap the vertical portion on another panel in order that the electrical apparatus be completely enclosed. Thus (Figs. 1 and 2) in the illustrated embodiment of the invention the upper vertical edge portion of each panel horizontally overlaps the lower vertical edge portion of the next adjacent higher panel. The planes of the upper and lower vertical edge portions of the panels are spaced sufficiently that a gap will be present between the lower vertical edge portion of the one panel and the overlapping upper vertcal edge portion of the next lower panel.

With the above disclosed panel and enclosure arrangement, no solid insulation is required between adjacent panels, and no bolts are necessary to clamp the panels together. Sufficient rigidity for the structure is provided by the vertical and horizontal bent edge portions of the panels. While the overlapping arrangement of the vertical edge portions of the panels electrically shields the gaps between adjacent panels, the air space between the edge portions insulates the panels from each other and provides for additional air circulation, and the individual panels are readily removable.

The panel arrangement of the invention has the additional advantage in that the corner posts flanges 25 and panels 13 may be predrilled with mounting holes prior to assembly since the exact spacing between adjacent panels is not critical. That is, slight inaccuracies in the dimensions of the panel due to the bending of the edges of the panel do not necessitate changes in the positions of the mounting holes in the panels or flanges 25 as it would if solid insulation were provided between the panels and the panels were bolted together as in previous practice. The cost of the enclosure may thereby be substantially reduced since the parts of the enclosure may have standard dimensions.

The corner posts, as illustrated in Figs. 1–3, are comprised of a sheet metal angle defining the outer edges of the enclosure, and edge flanges 25 that are set back, i.e., toward the apparatus, from the main portions of the corner posts. This arrangement permits the panels to be bolted to the flanges 25 without having the bolts extend beyond the corner posts. It will be obvious, of course, that other configurations of corner posts may be equally well applied without departing from the spirit or scope of the invention.

While the invention has been disclosed with reference to such terms as "vertical," "horizontal," "upper" and "lower," it will be understood that these terms are purely relative and are not intended to limit the actual physical positions of articles embodying the invention.

It will be further understood that, while the form of the invention herein shown and described constitutes the preferred embodiment of the invention, it is not intended herein to illustrate all of the possible equivalent or ramifications thereof. It will also be understood that the words used are words of description rather than of limitation, and that various changes may be made without departing from from the spirit or scope of the invention herein disclosed, and it is aimed in the appended claims to cover all such changes as fall within the true spirit and scope of the invention.

What we claim as new and desire to secure by Letters Patent of the United States is:

1. A panel for an enclosure for electrical apparatus comprising a metallic sheet of substantially uniform thickness having a rectangular central portion, a pair of opposite sides of said sheet having right angle bends defining an edge portion on each of said sides parallel to said central portion on the same side thereof and joined to said central portion by an intermediate portion perpendicular to said central portion, said edge portions extending in the same direction from said intermediate portions so that one edge portion overlaps said central portion and the other edge portion extends beyond said central portion, said one edge portion extending in a first plane and said other edge portion extending in a second plane, said second plane being spaced from said central portion by a greater distance than the distance between said central portion and said first plane, the relative difference between said greater distance and the last mentioned distance being more than the thickness of said metallic sheet, whereby when a plurality of such panels are aligned with their central portions in a given plane so that said other edge portion of one panel will overlap said one edge portion of an adjacent panel the other edge portion and the one edge portion of adjacent panels will be spaced apart a distance sufficient to provide an insulating air gap therebetween.

2. An enclosure for electrical apparatus comprising a plurality of vertical spaced apart corner posts surrounding said apparatus, and a plurality of rectangular panels rigidly extending between said posts in vertical planes defined by adjacent posts, the panels between each pair of adjacent posts being vertically spaced apart and having parallel edges, the upper and lower edges of each panel having horizontal bends extending thereacross and defining upper and lower vertical edge portions joined to the upper and lower sides respectively of said central portion by intermediate horizontal portions, said vertical edge portions extending upwardly from their respective intermediate portions so that the lower vertical edge portion overlaps said central portion and the upper edge portion extends upwardly beyond the upper side of said central portion, said lower vertical edge portion extending in a vertical plane nearer to said central portion than the vertical plane of said upper edge portion, the upper vertical edge portion of each panel horizontally overlapping and being spaced apart from the lower vertical edge portion of the next adjacent higher panel a distance sufficient to provide an insulating air gap between adjacent panels.

3. In an enclosure for electrical apparatus, a pair of vertical corner posts, a plurality of generally rectangular panels extending between and rigidly affixed to said corner posts, said panels having central vertical portions defining a side of said enclosure, the lower side of each panel having horizontal bends defining a lower horizontal portion joining said central portion and extending toward said apparatus and a lower vertical edge portion extending upwardly from said lower horizontal portion, the upper side of each panel having horizontal right angle bends defining an upper horizontal portion joined to the upper side of said panel and extending toward said apparatus and an upper vertical portion extending upwardly from said upper horizontal portion, the upper horizontal portion of each panel being substantially parallel to and vertically spaced apart from the lower horizontal panel of the next adjacent higher panel a distance sufficient to provide an insulating air gap therebetween, and the upper vertical portion of each panel horizontally overlapping the lower vertical portion of the next adjacent higher panel and being substantially parallel to and spaced apart therefrom toward said apparatus a distance sufficient to provide an insulating air gap therebetween.

References Cited in the file of this patent

UNITED STATES PATENTS

| | | | |
|---|---|---|---|
| 715,156 | Satterfield | Dec. 2, | 1902 |
| 2,050,503 | Ray | Aug. 11, | 1936 |
| 2,123,287 | Ney | July 12, | 1938 |
| 2,209,375 | Anderson | July 30, | 1940 |
| 2,320,902 | Williams | June 1, | 1943 |
| 2,354,078 | Vance | July 18, | 1944 |
| 2,467,377 | Giegerich et al. | Apr. 19, | 1949 |
| 2,620,519 | Engelbach | Dec. 9, | 1952 |